Jan. 5, 1926.
C. F. COWDREY
1,568,802
BRAKE TESTING DEVICE FOR AUTOMOBILES
Filed May 24, 1924   2 Sheets-Sheet 1
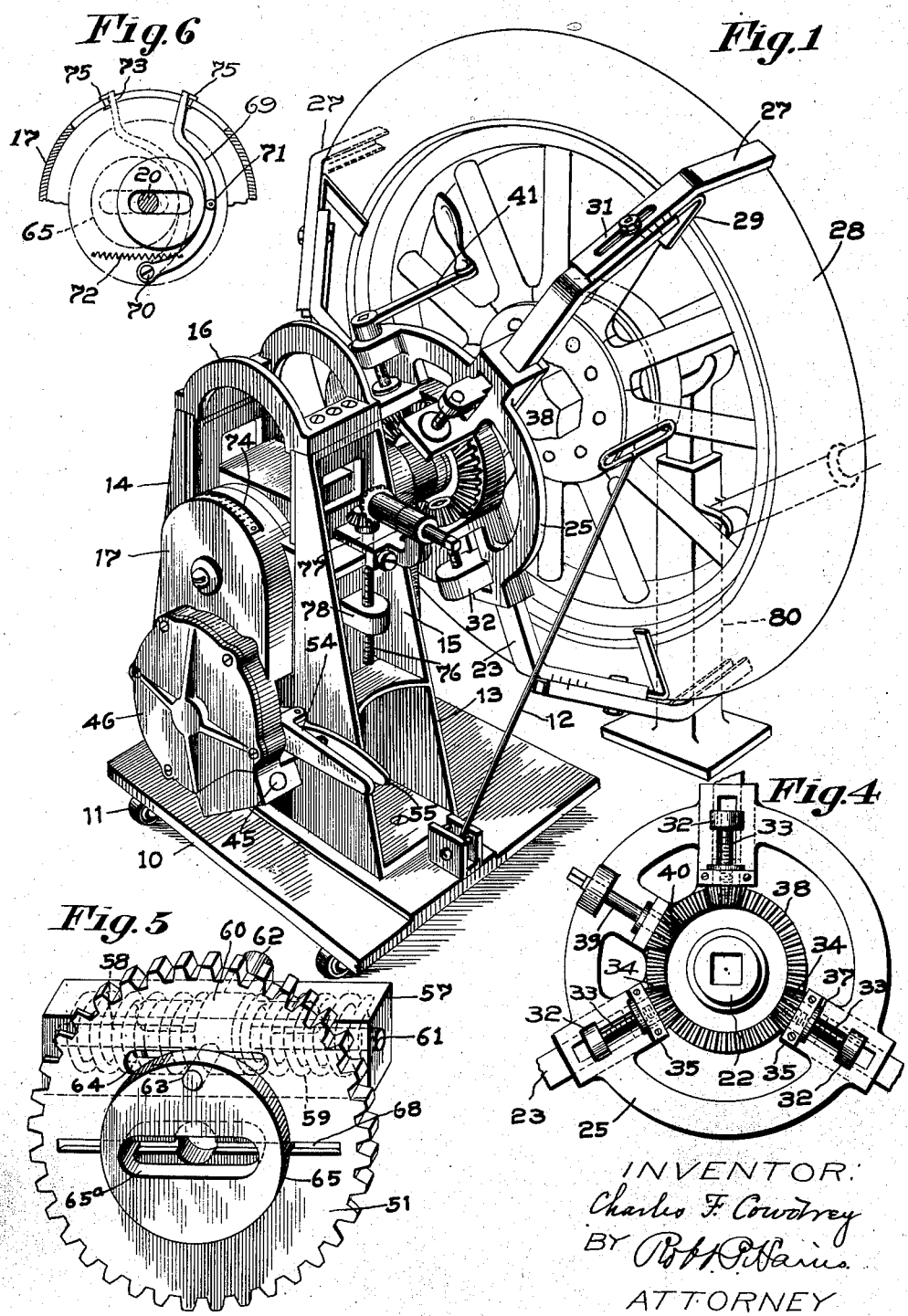
INVENTOR:
Charles F. Cowdrey
BY
ATTORNEY Jan. 5, 1926. 1,568,802
C. F. COWDREY
BRAKE TESTING DEVICE FOR AUTOMOBILES
Filed May 24, 1924 2 Sheets-Sheet 2
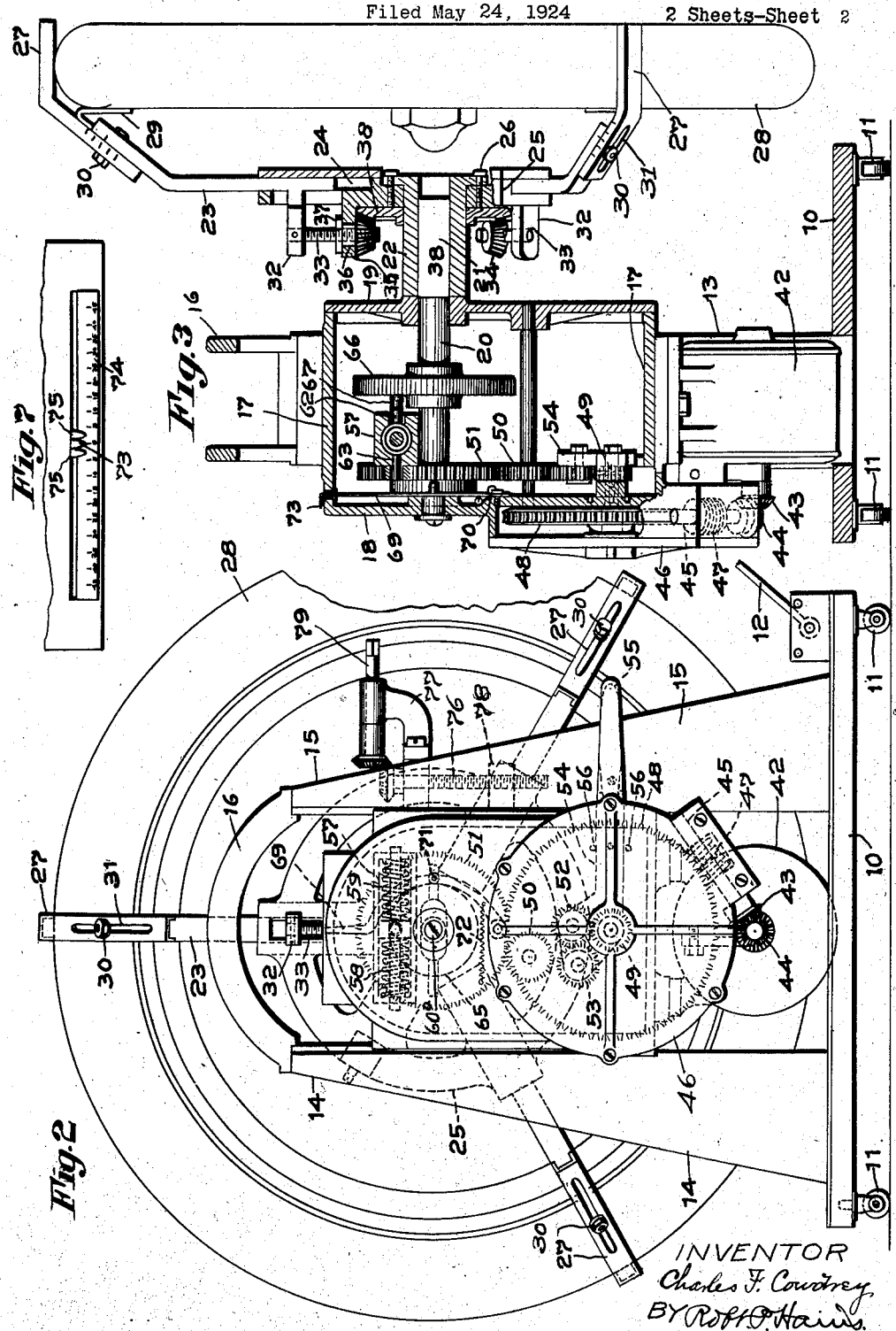
INVENTOR
Charles F. Cowdrey
BY Rob't P. Harris
ATTORNEY Patented Jan. 5, 1926.

1,568,802

UNITED STATES PATENT OFFICE.

CHARLES F. COWDREY, OF FITCHBURG, MASSACHUSETTS.

BRAKE-TESTING DEVICE FOR AUTOMOBILES.

Application filed May 24, 1924. Serial No. 715,576.

*To all whom it may concern:*

Be it known that I, CHARLES F. COWDREY, a citizen of the United States, residing in Fitchburg, county of Worcester, and State of Massachusetts, have invented an Improvement in Brake-Testing Devices for Automobiles, of which the following description, in connection with the accompanying drawings, is a specification, like characters on the drawings representing like parts.

This invention relates to means for testing the action of the brakes upon the wheels of an automobile or other vehicle.

It is very important that the brakes of an automobile be at all times properly adjusted so that the brake bands upon the opposite wheels will act with equal or substantially equal force, because the speed of an automobile cannot be checked promptly unless each brake band acts with a substantial amount of force upon its wheel. Furthermore, if the brakes act with unequal force upon the opposite wheels, the movement of the automobile upon application of the brakes is liable to cause the automobile itself to swerve from its direct path of travel with dangerous result.

It is well known that many of the automobile accidents that now frequently occur are due to faulty brakes, and the brakes are often improperly adjusted because heretofore there has been no good practical device for testing the action of the brakes upon each wheel under running conditions.

When brakes are provided upon all four wheels of an automobile, the problem of maintaining the brakes properly adjusted becomes of still greater importance, for if the brakes upon the front wheels act with greater force than the brakes upon the rear wheels, the greater retarding effect upon the front part of the automobile may cause the automobile to turn somersault with disastrous results.

Heretofore it has been proposed to place a lever or other operating means in engagement with a wheel of an automobile to rotate the wheel through a small angle while the brake is applied, and an indicator has been associated with the wheel turning means to indicate the force exerted to turn the wheel.

This proposed construction serves to indicate the force required to impart the initial rotative movement to the wheel, that is the force required to start the wheel rotating when the brake is applied; but does not indicate the true action of the brake upon a rotating wheel. In other words the construction proposed heretofore will indicate the force required to start a wheel rotating from the standing position, but will not indicate the retarding action of the brakes under actual running conditions, which is the brake action that serves to slow down an automobile or bring it to rest and is the reading desired.

Having the foregoing in mind the present invention is directed to a brake testing device that will indicate the retarding action of a brake upon a rotating wheel. In carrying out the present invention means is provided for imparting a continuous rotative movement to a wheel to turn it under brake resistance, and an indicator is provided for indicating the force exerted to rotate the wheel under brake resistance.

After the braking action upon one wheel has been tested and the reading of the indicator noted, the brake testing device is applied to the opposite wheel of the automobile and this wheel is tested while the brakes are applied the same as during the first test; and if a different reading is obtained the brakes obviously need adjustment.

The novel features of the invention and combination of parts will be best understood from the following description when read in connection with the accompanying drawings which illustrate one good practical form of the invention.

In the drawings:—

Fig. 1 is a perspective view of the brake testing device of the present invention shown in position to test the action of a brake upon a wheel of an automobile.

Fig. 2 is a front view of the brake testing device of Fig. 1.

Fig. 3 is a vertical sectional view through Fig. 1.

Fig. 4 is a front view of the central portion of the tire engaging device.

Fig. 5 is a perspective view of a driving gear, having the yielding power transmitting means mounted upon one face and the indicator actuating disk upon the other face.

Fig. 6 is a vertical sectional view showing the indicator and its actuating means; and Fig. 7 is a top plan view of a portion of the casing having a graduated scale for the indicator.

In the drawings the brake testing device of the present invention is shown as mounted upon a truck 10 provided with the wheels or rollers 11 and this truck is provided with a handle 12 by which it may be readily moved from place to place. Upon the truck 10 is mounted a stand or supporting frame 13 which is rigidly secured to the upper face of the truck. The stand 13 is shown as formed of spaced upright columns 14 and 15 which are connected at their upper end by a yoke 16. The columns 14 and 15 are disposed in spaced relation so that a casing 17 in which the various operating parts are enclosed may be mounted between the columns for sliding movement in a vertical direction.

The casing 17 is provided with the opposite spaced walls 18 and 19 which serve to rotatably support the shaft 20 having a squared outer end 21 that extends outwardly from the casing. The squared outer end of the shaft 20 is adapted to engage and rotate a wheel engaging device provided with a hub 22 having a central bore which is squared in cross section and is adapted to be slidably mounted upon the projecting end 21 of the shaft 20. The hub 22 is provided with means for engaging a wheel of an automobile to impart the rotative movement of the shaft 20 to the automobile wheel, and in the construction shown the hub is provided with the radially extending arms 23, the inner ends of which are slidably mounted in sockets 24 formed in an annular casting 25 which is rigidly secured to the hub 22 by bolts 26. The outer ends of the arms 23 are provided with the tire-engaging elements 27 which extend laterally to the arms 23 and are adapted to engage the tread of the tire 28 of an automobile wheel. The arms 23 may also be provided with strips 29 adapted to engage a side of the automobile tire to limit the movement of the tire-engaging device laterally towards the tire. The tire-engaging elements 27 and 29 may be rigidly secured to the outer end of the arms 23 by bolts 30, and since it may be desirable to secure the elements 27 in different positions of adjustment upon the arms 23 to accommodate different sized automobile wheels, the tire-engaging elements 27 are shown as provided with elongated slots 31 adapted to adjustably receive the bolts 30.

The tire-engaging device shown is provided with three arms 23 disposed at an angle of 120 degrees apart. It is desirable to provide means for moving the outer ends of these arms 27 simultaneously into gripping engagement with the tread of the tire 28 and thereby firmly secure the tire-engaging device centrally upon an automobile wheel the brake of which is to be tested. Various means might be provided for moving the arms 23 simultaneously inwardly towards the axis of the hub 22 and in the present case this is accomplished by providing each arm 23 with a laterally extending portion 32 to which the outer end of a threaded bolt 33 is rigidly secured. Each of the bolts 33 extends into and has threaded engagement with the inner threaded bore of a bevel pinion 34 which pinion is mounted upon and is rotatably supported by a laterally extending arm 35 of the annular casting 25. Each pinion is provided with a hub portion 36 which is journaled in a bore formed in the bracket 35 and the hub portion is retained in the bore by a flange 37 at its outer end. The bevel pinions are simultaneously rotated by the beveled gear 38 rotatably mounted upon the hub 22 and this gear may be driven by means of a shaft 39 having a beveled pinion 40 rigidly secured to its inner end and the outer end of this shaft is preferably squared to receive a crank handle 41. The arrangement is such that when the crank handle is rotated it rotates the beveled gear 38, which in turn rotates each of the threaded pinions 34 and these pinions, due to their threaded engagement with the bolts 33 slide the arms 23 radially either towards or from the hub 22, depending upon the direction in which the crank handle 41 is rotated. From the foregoing it will be apparent that the tire-engaging device just described may be easily applied to the wheel of an automobile, whereupon the crank handle 41 may be rotated to draw the arms inwardly into rigid clamping engagement with the tire 28, and if desired the inner face of the tire-engaging elements 27 may be provided with longitudinally extending ribs or blades, as shown in Fig. 1, which will bite into the tire slightly to prevent slippage. As above stated the hub 22 is slidably mounted on the projecting end of the shaft 20 and as a result the tire gripping device may be readily disengaged from the shaft 20 and applied to an automobile wheel, whereupon the truck 10 supporting the mechanism for rotating the wheel under brake resistance may be moved into the position shown in Fig. 1 with the squared end 21 of the shaft extending into the bore of the hub 22.

Means is provided for rotating the shaft 20 to rotate an automobile wheel under brake resistance, and indicating means is provided for indicating the force required to rotate the wheel. In the construction shown the operating parts are driven by an electric motor 42 which may be secured to the lower face of the casing 17. The central shaft of this motor is provided with a small bevel pinion 43 which drives a similar pinion 44 secured to one end of a shaft 45 rotatably mounted within a gear housing 46.

The shaft 45 is provided with a worm 47 which drives the worm wheel 48 within the housing 46 and the central shaft of the worm wheel 48 is provided with a pinion 49. Power is imparted from the pinion 49 to a spaced pinion 50 and the gear 50 drives a gear wheel 51 rotatably mounted upon the shaft 20. It is desirable to provide means for rotating the shaft 20 in either a right or left-hand direction, and reversing means is therefore provided between the pinions 49 and 50 consisting of the pair of gears 52 and 53 which are in mesh with each other and are rotatably mounted upon the rocking lever 54, and the gear 52 is also in mesh with the pinion 49. The arrangement is such that the lever 54 may be rocked in one direction to bring the gear 53 in mesh with the pinion 50 to drive the shaft 20 in one direction or the lever 54 may be rocked in the opposite direction to move the gear 52 into mesh with the pinion 50 to rotate the shaft 20 in the opposite direction. The lever 54 is provided with a handle at its outer end and with a pivoted element 55, the inner end of which is provided with a pin adapted to enter in one of the three holes 56 formed in a wall of the casing and adapted to hold the lever 54 in a central neutral position, or in the positions in which one gear or the other is held in mesh with the pinion 50.

In order to provide means for indicating the rotating force that is applied to the shaft 20 and to the automobile, in the construction shown, the gear wheel 51 has a block 57 rigidly secured to one face and in which is formed a bore adapted to receive the coiled springs 58 and 59. Between the springs 58 and 59 is mounted a head 60 which is rigidly secured to a shaft 61 mounted to slide longitudinally within the block 57; the arrangement is such that the head 60 and the shaft 61 to which it is secured may be moved longitudinally within the block 57, but this movement in one direction is resisted by the spring 58, while its movement in the opposite direction is resisted by the spring 59. The head 60 is provided with a pin 62 which is rigidly secured to the head and extends laterally therefrom away from the gear wheel 51, and this head is provided with a second pin 63 which projects through a slot 64 formed in the gear 51 and extends into a drill hole formed in the disk 65 slidably mounted upon one face of the gear wheel 51. As stated the gear wheel 51 is rotatably mounted upon the shaft 20 and in order to drive the shaft 20 from the gear 51 a wheel 66 is keyed or otherwise rigidly secured to the shaft 20 and this wheel is provided with a laterally extending pin 67 adapted to engage the pin 62 projecting from the head 60. The arrangement is such that as the gear 51 is rotated the block 57 will rotate with the gear and by means of the pins 62 and 67 will impart its rotative movement to the wheel 66 and thereby drive the shaft 20, but since the head 60 is mounted for yielding sliding movement within the block 57 the driving force imparted to the wheel 66 by the head 60 will cause this head to slide lengthwise of the block 57 in opposition to one of the springs 58 and 59. This sliding movement of the head by means of the laterally extending pin 63 will impart a similar sliding movement to the disk 65 which disk is slidably secured to one face of the gear 51 by a key that extends into a slot 68 formed in a face of the gear 51. The arrangement is such that the disk 65 is normally in a position in which it is concentric with the gear 51, but, when an automobile wheel is being rotated under brake resistance, the driving torque imparted from the gear 51 to the wheel 66 serves to compress one of the springs 58, 59 and move the disk 65 laterally of the gear 51 to an eccentric position. An elongated slot 65ª is formed in the disk 65 to clear the central shaft 20 when the disk is slid in one direction or the other. The movement of the disk 65 upon the face of the gear 51 out of its normal concentric position serves to operate an indicator needle 69 the lower end of which is pivotally secured to a wall 18 of the casing by a screw 70. The indicator needle is provided with a roll 71 which rests against the outer periphery of the disk 65 and as a result any displacement of the disk 65 from its normal central position will serve to swing the indicator needle in a lateral direction. The indicator needle is urged towards the disk by a spring 72, and the upper end of this needle extends through a slot formed in the upper face of the casing 17 and is bent to form a pointer 73 which moves over the graduated scale 74. From the foregoing it will be seen that the yielding means provided between the driving gear 51 and wheel 66 serves to move the disk 65 in one direction or the other out of the position in which it is concentric with the gear 51. As a result of this construction, when the gear is in one position the disk 65 will occupy the position shown in full lines in Fig. 6 and when the gear is rotated through an angle of 180 degrees the disk 65 will occupy the position shown in dotted lines in Fig. 6. Since the roller 71 of the indicator needle is held in engagement with the periphery of the disk 65 the needle 69 will move from the position shown in full lines in Fig. 6 to that shown in dotted lines. It will therefore be seen that the needle 69 will swing back and forth over the graduated scale during each complete rotation of the shaft 20, but as the shaft 20 will be rotated at a relatively slow speed no difficulty will be experienced in noting the range of movement of the pointer 73 over the graduated dial. If desired, sliding indicators 75 may be mounted upon the scale 74 and they may be constructed to remain in the maximum position to which they are moved by the reciprocating needle, so that these indicators will serve as recording devices to record the maximum movement of the needle.

The reversing mechanism above described by which the shaft 20 may be driven in one direction or the other is desirable because in testing the brake action upon the wheels at the opposite sides of an automobile it will be necessary to rotate the wheel-driving means in one direction in testing one brake and in the opposite direction in testing the brake upon the opposite side of the automobile. When the gear 51 is driven in one direction the laterally extending pins 62 will rest against one face of the pin 67 and when the gear 51 is rotated in the opposite direction the pin 62 will be rotated through approximately a complete circle and will abut against the opposite side of the pin 67 to drive the shaft 20 in the opposite direction.

The casing 17 is slidably mounted between the upstanding columns 14 and 15 so that it may be raised or lowered to bring the shaft 20 into axial alignment with the axis of the wheel to be tested. Simple means for raising and lowering the casing 17 consists of a threaded shaft 76 the upper end of which is journaled in a bracket 77 supported by the column 15. The threaded portion of the shaft 76 engages a threaded lug 78 extending laterally from the casing 17. The threaded shaft is rotated to raise or lower the casing by means of a horizontally extending shaft 79 rotatably supported by the bracket 77 and the inner end of the shaft 79 is provided with a bevel pinion that meshes with and drives a bevel pinion secured to the upper end of the threaded shaft 76. The outer end of the shaft 79 is squared to receive the operating crank 41, and the casing 17 may be raised or lowered by rotating the crank in one direction or the other.

The wheel being tested should be supported out of engagement with the ground during the testing operation and in Fig. 1 the wheel is shown as supported out of engagement with the ground by an ordinary jack 80.

During the testing of the action of the brakes upon the different wheels of an automobile, the brake is applied and should be held in the same brake applying position through the entire testing operation. If the brakes operate by a foot treadle are to be tested the foot treadle may be maintained in the brake applying position by the means disclosed in the Charles F. Cowdrey Patent No. 1,476,393, granted December 4, 1923.

After the action of the brake upon one wheel has been tested and the indication of the pointer noted, the tire-engaging device is then removed from the wheel which has been tested and is applied to the wheel upon the opposite side of the automobile, whereupon this wheel is tested and if it is found that a different reading is obtained during the testing of this second wheel, it is obvious that the brakes are not acting the same upon both wheels and adjustment of the brakes is necessary.

What is claimed is:—

1. A brake tester for testing the action of the brakes upon the wheels of an automobile, comprising in combination, a supporting frame, a wheel engaging device for turning an automobile wheel, a pair of rotative elements mounted upon said frame to rotate about a common axis and one of which elements is in driving engagement with said wheel engaging device, a yielding driving connection between said elements for imparting rotative movement of one element in either a right-hand or left-hand direction to the other, and an indicator operable by the yielding movement of the driving connection in either direction to indicate the force required to rotate the wheel under brake resistance.

2. A brake tester for testing the action of the brakes upon the wheels of an automobile, comprising in combination, a supporting frame, a wheel engaging device for turning an automobile wheel, a driving shaft rotatively supported by said frame and having driving engagement with the wheel engaging device, a driving wheel for said shaft, means for rotating said driving wheel, resilient means for imparting the rotative movement of the driving wheel to the shaft, a disk mounted upon the driving wheel for movement transversely of the wheel to and from a position concentric with the wheel under the action of said resilient means, and an indicator actuated by the displacement of the disk from the axis of the driving wheel to indicate the rotative force exerted to turn the wheel under brake resistance.

3. A device for testing the action of the brakes upon the wheels of an automobile, comprising in combination, means for rotating a wheel of an automobile under brake resistance, and means interposed between the automobile wheel and source of power for indicating the force applied to the wheel to turn it, comprising a driving wheel, a yielding driving connection, a disk mounted upon the driving wheel and movable to and from a position concentric with the axis of said wheel under the action of said yielding means, and an indicator operable by the displacement of the disk from the axis of the driving wheel to indicate the driving force applied to the automobile wheel.

4. A device for testing the action of the brakes upon the wheels of an automobile, comprising in combination, means for rotating a wheel of an automobile under brake resistance, means interposed between the source of power and automobile wheel comprising a driving wheel and a yielding driving connection, an actuator upon said driving wheel and movable under the action of the yielding driving connection, and an indicator moved by said actuator to indicate the driving force applied to the automobile wheel.

5. A brake tester for testing the action of the brakes upon the wheels of an automobile, comprising in combination, a supporting frame, a driving shaft supported by the frame and rotatable in one direction to turn a wheel upon one side of an automobile under brake resistance and rotatable in the opposite direction to turn a wheel upon the other side of the automobile under brake resistance, means for imparting the rotative movement of said shaft to an automobile wheel, and means for indicating the force exerted in either direction to turn the automobile wheels under brake resistance.

6. A brake tester for testing the action of the brakes upon the wheels of an automobile, comprising in combination, a supporting frame, a driving shaft supported by the frame and provided with means for rotating an automobile wheel under brake resistance, power means for rotating the shaft, reversing means for rotating the shaft in one direction to turn the wheel at one side of an automobile and in the opposite direction to turn the wheel at the opposite side of the automobile, and means for indicating the force exerted in either direction to turn the automobile wheels under brake resistance.

7. A brake tester for testing the action of the brakes upon the wheels of an automobile, comprising in combination, a supporting frame, a driving shaft supported by the frame and provided with means for rotating an automobile wheel under brake resistance, driving means for rotating said shaft in either direction, a yielding connection between the driving means and shaft, constructed to yield in either direction of rotation as the turning force increases, and an indicator operable by said yielding movement to indicate the turning force applied to the automobile wheel by rotating said shaft in either direction.

8. A brake tester for testing the action of the brakes upon the wheels of an automobile, comprising in combination, a supporting frame, a driving shaft supported by the frame and provided with means for rotating an automobile wheel under brake resistance, driving means for rotating said shaft in either direction, and means operable by rotation of the shaft in either direction to indicate the force exerted in either direction to turn the automobile wheels under brake resistance.

In testimony whereof, I have signed my name to this specification.

CHARLES F. COWDREY.